May 7, 1963 R. G. LE TOURNEAU 3,088,537
VEHICLE OPERATOR'S STATION
Filed May 31, 1961 2 Sheets-Sheet 2

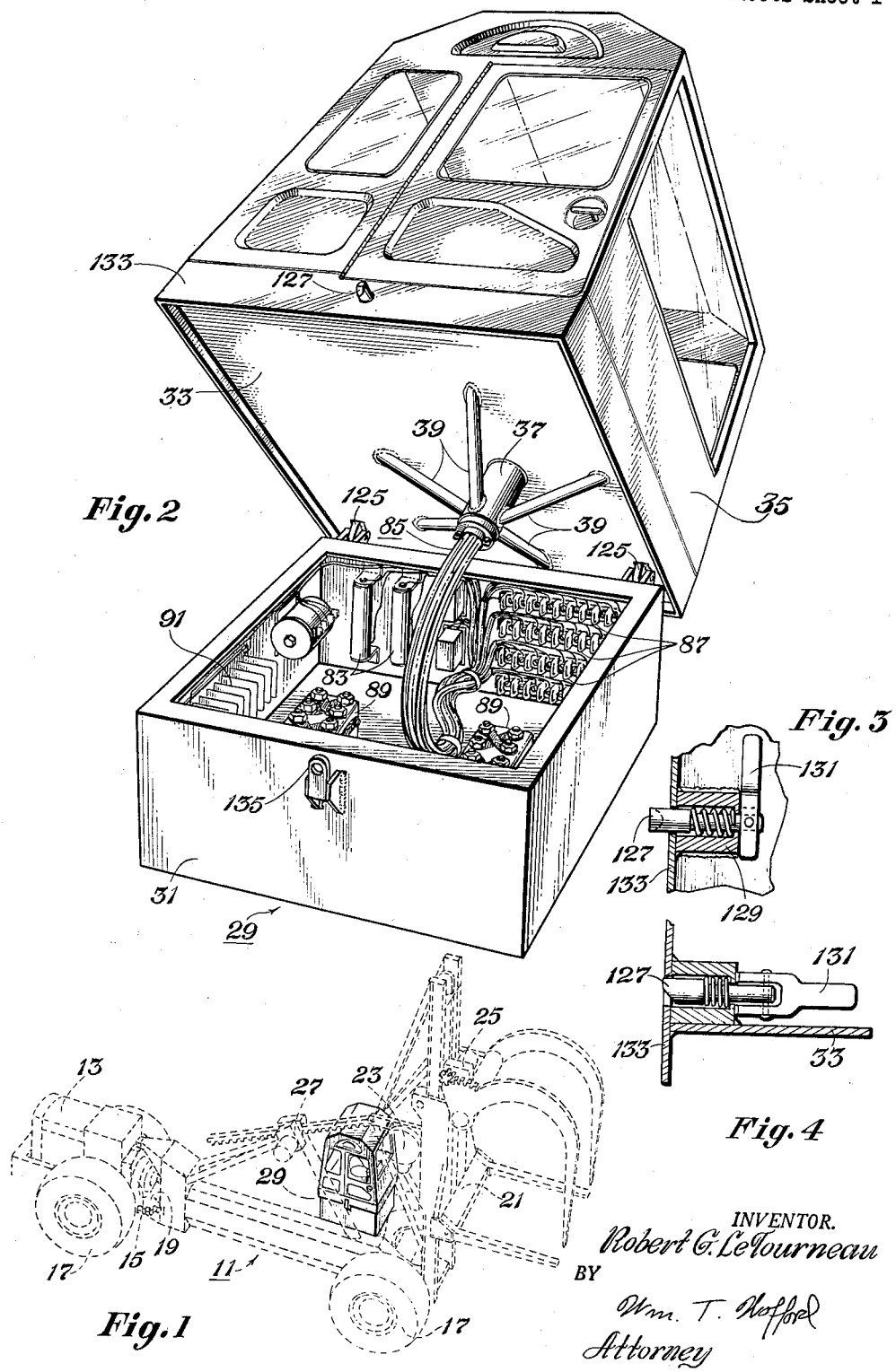

INVENTOR.
Robert G. LeTourneau
BY
Wm. T. Wofford
Attorney

United States Patent Office 3,088,537
Patented May 7, 1963

3,088,537
VEHICLE OPERATOR'S STATION
Robert G. LeTourneau, P.O. Box 2307, Longview, Tex.
Filed May 31, 1961, Ser. No. 113,890
9 Claims. (Cl. 180—77)

This invention relates to the operator's station of a work performing vehicle, and particularly to the structure and arrangement of the operator's seat, vehicle control panel, and associated apparatus.

In one of its aspects, the present invention is particularly applicable to a self-propelled work vehicle of a type wherein it is very desirable that the operator be able to face in various directions as the machine performs its work functions, and yet at all times be located conveniently relative to the machine controls. In such a vehicle it is also desirable that the operator should be able to easily select the direction he is to face and readily maintain the selected direction.

In another of its aspects, the present invention is particularly applicable to the problem of seating an operator for maximum comfort and effectiveness on a vehicle wherein the operator station may be directly subjected to severe jolting, pitching, and swaying motions as the vehicle performs its work functions.

In another of its aspects, the present invention is particularly applicable to a self-propelled work performing vehicle which is electrically powered and controlled.

Accordingly, the general object of this invention is to provide an improved operator station for a self-propelled work vehicle. More specific objects of the invention are: to provide a control station wherein the operator can always conveniently reach the machine controls regardless of the direction he faces; to provide a control station wherein the operator can readily select and maintain any facing position; to provide a control station wherein the operator may be seated for maximum comfort and effectiveness; to provide a control station wherein the operator may readily control the characteristics of his seat to best suit operating conditions and his personal taste; and to provide a control station arrangement ideally suitable for a vehicle which is electrically powered and controlled.

These and other objects are effected by my invention as will be apparent from the following description taken in accordance with the accompanying drawings, forming a part of this application, in which:

FIGURE 1 is a schematic perspective view partially in phantom, showing an operator's station in accordance with the present invention mounted on a work vehicle;

FIGURE 2 is a schematic perspective view showing the interior of the control apparatus compartment;

FIGURES 3 and 4 are schematic detail views, partially in section, showing the platform to control apparatus compartment latch mechanism;

Figure 5:
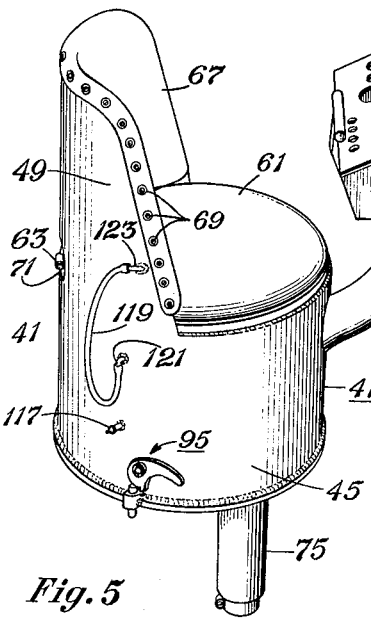
FIGURE 5 is a schematic perspective view showing an operator's seat and control panel in accordance with a preferred embodiment of the present invention.

The present invention may of course be utilized by various types of work vehicles, such for example as earth working machines, mobile cranes, logging machines, material handling machines, land clearing machines, load hauling machines, and the like.

For purposes of illustration, the invention is shown in the drawings as applied to an electrically powered and controlled self-propelled work vehicle in the form of a "log stacker" (see FIGURE 2). The "log stacker" 11 in a broader sense may be considered as a large material handling machine of the fork-lift type, capable of lifting loads up to about sixty tons, depending upon the machine size. The "log stacker" is powered by an internal combustion engine 13 driving an electric generator 15. Each wheel 17 incorporates a driver in the form of a self-contained electric motor driven gear reduction. One pair of wheels is steerable by means of an electric motor driving a steering sector gear 19. The lift carriage 21 is powered by an electric motor driven gear reduction 23, as is the load clamp mechanism (gear reduction 25) and the carriage bed tilt mechanism (gear reduction 27). Thus, the "log stacker" may be said to be electrically powered and controlled. This is a typical and common characteristic of the type machines to which the present invention in some of its aspects, is particularly applicable. In other words, these machines all have a generator system supplying power to electric motor driven wheels, and to electric motor driven mechanisms for performing the vehicle steering and the various work functions of the machine. The machines are of course controlled from an operator station, which is the subject of the present invention.

The operator's station 29 includes a box-like control apparatus compartment 31 which serves as a base for a platform 33 which is hingedly fixed to form a top closure for said compartment. The platform 33 may, if desired, have an enclosed operator's cab 35 supported upon and integral with it. The platform floor 33 is preferably made of steel plate material having an opening at its center portion. Supported by the margins of said opening and fixed thereto, preferably by welding, is an upstanding hub structure 37. The hub structure protrudes slightly above the platform floor and sufficiently below the floor to allow adequate bracing 39 to hold said hub rigid. Also included in the operator's station is a seat 41 and a control panel 43. The purpose of the hub structure 37 is to provide a bearing support for the seat 41 and control panel 43.

The operator's seat includes a frame in the form of a metal cylinder 45 having an integral bottom closure 47 and an open upper end. An integral extension 49 is contoured to form a seat back support. A concave metal dish member 51 is integrally fixed to the cylinder 45 at seat height, forming a closure for the upper end of the cylinder. The dish member 51 is formed so that it has a horizontal rim portion 53 fixed at its peripheral edge to said cylinder 45 and extending slightly inwardly therefrom, then a vertical band portion 55 extending slightly upwardly from the rim portion, then a rolled portion 57 curving slightly outwardly and upwardly and then inwardly and downwardly forming the dish. The dish member 51 is provided with a plurality of perforations 59 for a purpose to be hereinafter explained. A seat surface 61 in the form of an air impervious resilient material, such as rubber has a circular shape of diameter slightly larger than that of the cylinder 45. The peripheral portion of the seat surface is clamped by means of a clamping band 63, to the vertical band portion 55 of the dish member 51. A metal tubular member 65 extends along the inner peripheral portion of the seat back support 49 and is integrally fixed thereto. A padded seat back 67 fits the inner contour of the seat back support 49 and is fixed by suitable fastener means 69 to the tubular member 65, and also along its lower margin to the seat back support 49. An opening 71 at the lower center portion of the seat back support allows access to the fastener and tightener joint of the clamping band 63.

A combination conduit, pivot bearing, and support member 73 in the form of a metal tube or pipe, has a lower straight portion 75 merging with a first curved portion 77 which in turn merges with a reverse curve portion 79, which in turn merges with an upper straight portion 81. The curved portions 77, 79 serve to offset the lower straight portion 75 from the upper straight portion 81. This combination members 73 is fixed to and partly contained within the cylinder portion 45 of the seat frame. More specifically, the lower straight portion 75 protrudes vertically downward from the bottom closure 47 through an opening therein, the first curved portion 77 is contained within the cylinder 45, with the member 73 protruding through an opening in the cylinder at about the juncture of the curved portions 77, 79. The openings in the bottom closure 47 and the cylinder 45 are so located that they and the combination member 73 are bisected by a vertical plane which contains a diameter of the cylinder 45 and also bisects the seat back 49. The bottom closure opening is located about two-thirds of the way forward on a closure diameter, and the cylinder opening is located at about two-thirds of the cylinder height. The combination member 73 is integrally fixed to both said closure and said cylinder openings.

The lower straight portion 75 of the combination member 73 is of length a little greater than that of the platform hub 37, and has an external diameter slightly less than the hub internal diameter. The seat 41 is placed on the platform 33 with the combination member lower straight portion 75 received by the hub 37, and with the bottom closure 47 resting on the hub upper end. The straight portion 75 is retained within the hub 37 by suitable means such as set screws 83 which are carried by the straight portion 75 which protrudes beneath the hub 37, with the set screws bearing on the hub lower end. Thus, the seat 41 is free to rotate on the platform 33 about the hub central axis.

Fixed onto the upper end of the combination member upper straight portion 81 is the control panel 43. All of the machine operations are controlled from this control panel. Mounted to the control panel are the necessary indicators (not shown) such as engine speed, temperature, fuel guage, oil pressure, vehicle speed, generator voltage, and the like. Also mounted to the control panel are starter controls, throttle controls, vehicle wheel motor controls, vehicle steering controls, vehicle braking controls, and machine function controls (not shown). All of the foregoing controls are electrical, and the control leads 85 (electrical connections) extend from the control panel 43 down through the combination member 73 and into the control apparatus compartment 31. The control apparatus compartment 31 contains such apparatus as terminal strips 87, relays 89, rectifiers 91, resistors 93, and the like, and serves as an electrical distribution and "nerve" center for the machine.

Figure 9:
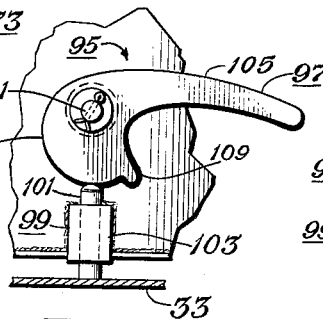
FIGURES 9 and 10 are detailed views of the seat pivot lock mechanism.
Figure 10:
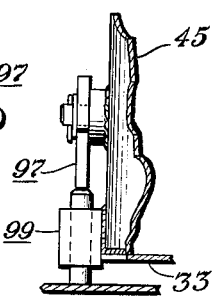
Figure 6:
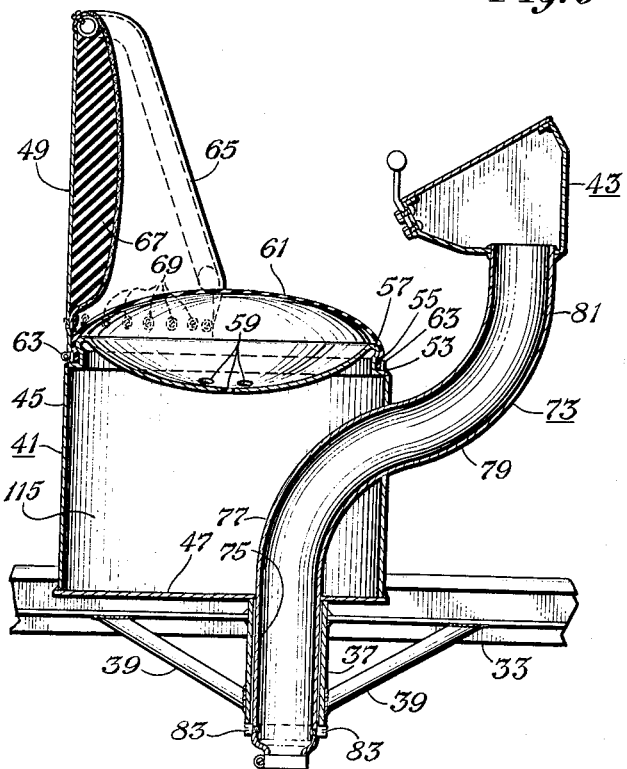
FIGURE 6 is a vertical section view of the apparatus shown by FIGURE 5.
Figure 11:
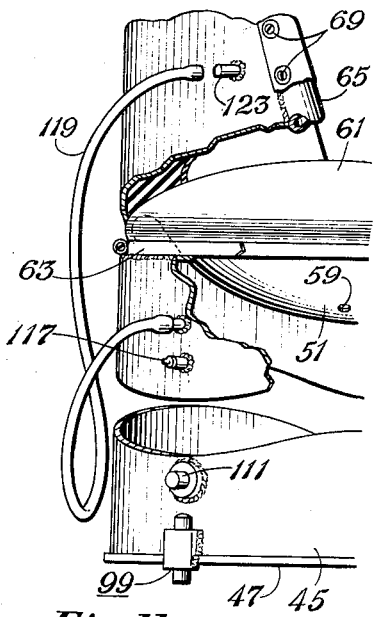
FIGURE 11 is a schematic fragmentary view, with parts broken away, of the seat of FIGURE 5.

The machine operator sits on the seat 41 astride the combination member 73, and in front of and within convenient reach of the control panel 43. He can readily swing the seat 41 to face any desired direction; with the swinging movement being facilitated by the fact that the seat pivot axis is ahead of the seat center. The operator can easily lock the seat in any position by use of a friction locking device 95 (see FIGURES 9 and 10). The friction locking device includes a cam actuator 97 and a snubber 99. The snubber is simply a short rod or plunger 101 carried by a sleeve 103 which is fixed to the bottom portion of the seat cylinder 45. The plunger 101 is free to move vertically within the sleeve 103, with its lower end in contact with the upper surface of the platform 33. If desired, the plunger can be spring biased so as to be out of contact with the platform except when in the locking position. The cam actuator 97 is a single member having a handle portion 105, a cam portion 107 and a stop portion 109, and is pivotally secured at 111 to the seat cylinder 45 above the plunger 101 so that the cam portion 107 bears on the upper end of the plunger 101.

Figure 7:
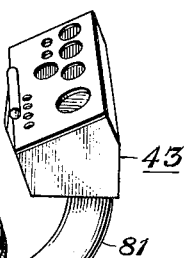
FIGURES 7 and 8 are schematic plan views of the seat and platform.
Figure 8:
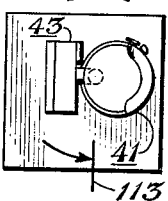

The friction locking device is positioned so that the handle portion 105 is within convenient reach of the operator. As the handle 105 is moved forward and downward, the cam portion 107 forces the plunger 101 into pressure contact with the platform 33. When the handle 105 is in its full forward position, with the plunger 101 contacting the stop 109, there is sufficient friction between the plunger 101 and platform 33 to lock the seat 41 against rotation. As the handle is moved upward and backward, the cam portion moves in the direction away from the plunger, releasing the pressure on the plunger. A stop indicated at 113 in FIGURES 7 and 8 is fixed to the upper surface of the platform 33 and is engageable with the plunger 101 to prevent the seat 41 from being rotated more than 360 degrees in either direction. Thus, the seat can rotate 360 degrees in either direction from the stop 113, but having rotated to the stop in one direction, it must then rotate in the other direction. This prevents undue twisting of the control leads 85.

The seat cylinder 45, together with the seat bottom closure 47 and the seat surface 61, forms an airtight enclosure 115. Air under pressure may be introduced into the enclosure via a valve 117 which is mounted on the wall of the seat cylinder 45. Thus, the seat surface 61 may be inflated to any desired degree. The degree of air pressure on the seat surface required to comfortably support the operator is sufficiently low that the operator can adjust the seat inflation to suit his taste. For this purpose there is provided a flexible air conduit 119 fixed at one end to a fitting 121 which communicates with the inside of the seat cylinder 45. The other end of the conduit 119 is normally resting on a second fitting 123 which is closed. When the operator desires to change the seat inflation, he merely removes the conduit 119 from the closed fitting 123 and either allows air to escape from the enclosure 115, or blows air in through the conduit, as he desires. When the requisite seat inflation is accomplished, the operator replaces the conduit end onto the closed fitting 123. Thus, the initial seat inflation can be accomplished with air taken from a machine supply, and inflation adjustments can be made by the operator by either blowing more air in or letting some escape.

When the seat surface 61 is inflated, of course, there is air in the space between the metal dish 51 and the seat surface 61. The openings 59 in the dish 51 are sized so as to damp the movement of air due to sudden impact loads on the seat surface 61, thus providing the operator a smoother ride.

Since the operator's station 29 is a self-contained unit, and requires only electrical connections with the rest of the work vehicle, the choice of its location on the work vehicle is quite flexible. Thus, the operator's station 29 may be mounted to the vehicle at the most strategic location and need not interfere with the best arrangement of the vehicle structure and work performing mechanisms.

As hereinbefore mentioned, the platform 33 which carries the operator's seat 41 and control panel 43 forms a hinged closure for the control apparatus compartment 31. The platform 33 is hinged at 125 on one side and removably latched at the other side. A movable latch bolt 127 (see FIGURES 3 and 4) is carried by a cylinder 129 which is fixed to the platform rim inside surface. The bolt is spring biased and is controlled by a cam lever 131 pivoted intermediate its length on the bolt inner end. The bolt is reciprocable through an opening in the platform rim 133. In the latch position, the bolt 127 protrudes outwardly from the platform rim 133 and is received by an opening in a latch member 135 which is fixed to the control apparatus compartment 31. In the unlatched position, the bolt is, of course, withdrawn. The interior of the control apparatus compartment 31 is thus readily accessible for maintenance, repair, testing, etc.

The foregoing disclosure and the showings made in the drawings are merely illustrative of the principles of this

5 invention and are not to be interpreted in a limiting sense.

I claim:

1. An operator's station for an electrically powered and controlled work vehicle comprising: a control apparatus compartment having an open top, a platform hingedly secured to said compartment and serving as a top closure for same, a hub fixed to said platform and having a central bore communicating with the interior of said compartment, an operator's seat, conduit means fixed to said seat and coacting with said hub to allow pivoting movement of said seat on said hub about the hub central axis, said conduit means having a portion extending forwardly and upwardly from the front of said seat, a control panel mounted on said conduit means at the upper end portion thereof, with said conduit means communicating between said control panel and said compartment.

2. An operator's station for an electrically powered and controlled vehicle comprising: a control apparatus compartment having an open top, a platform hingedly secured to said compartment and serving as a top closure for same, latch means for said platform, a hub fixed to said platform and having a central bore communicating with the interior of said compartment, an operator's seat having a central axis, conduit means fixed to said seat in front of said axis and coacting with said hub to allow for pivoting movement on said hub about the hub central axis, said conduit means having a portion extending forwardly and upwardly from the front of said seat, a control panel mounted on said conduit means at the upper end portion thereof, with said conduit means communicating between said control panel and said compartment, and electrical conductors extending via said conduit means from said compartment to said control panel.

3. An operator's station for an electrically powered and controlled vehicle comprising: a control apparatus compartment having a hinged top closure serving as a platform, a hub fixed to said platform and having a central bore communicating with the interior of said compartment, an operator's seat, conduit means fixed to said seat and coacting with said hub to allow pivoting movement of said seat on said hub about the hub central axis, said conduit means having a portion extending forwardly and upwardly from the front of said seat, a control panel mounted on said conduit means at the upper end portion thereof, with said conduit means communicating between said control panel and said compartment.

4. An operator's station for an electrically powered and controlled vehicle comprising: a platform mounted on said vehicle, a hub fixed to said platform and having a central bore communicating through said platform, an operator's seat, conduit means fixed to said seat and coacting with said hub to allow for pivoting movement on the hub about its central axis, said conduit means having a portion extending forwardly and upwardly from the front of said seat, a control panel mounted on said conduit means at the upper end portion thereof, with said conduit means communicating from said control panel to beneath said platform.

5. An operator's station for an electrically powered and controlled vehicle comprising: a platform mounted on said vehicle, a hub fixed to said platform and having a central bore communicating through said platform, an operator's seat, having a central vertical axis, conduit means fixed to said seat in front of said axis and coacting with said hub to allow for pivoting movement on the hub about its central axis, said conduit means having a portion extending forwardly and upwardly from the front of said seat, a control panel mounted on said conduit means at the upper end portion thereof, with said conduit means communicating from said control panel to beneath said platform.

6

6. An operator's station for an electrically powered and controlled work vehicle comprising: a control apparatus compartment having an open top, a platform hingedly secured to said compartment and serving as a top closure for same, a hub fixed to said platform and having a central bore communicating with the interior of said compartment, an operator's seat, conduit means fixed to said seat and coacting with said hub to allow 360 degree pivoting movement of said seat on said hub about the hub central axis, said conduit means having a portion extending forwardly and upwardly from the front of said seat, a control panel mounted on said conduit means at the upper end portion thereof, with said conduit means communicating between said control panel and said compartment.

7. An operator's station for an electrically powered and controlled vehicle comprising: a platform mounted on said vehicle, a hub fixed to said platform and having a central bore communicating through said platform, an operator's seat, conduit means fixed to said seat and coacting with said hub to allow for 360 degree pivoting movement on the hub about its central axis, said conduit means having a portion extending forwardly and upwardly from the front of said seat, a control panel mounted on said conduit means at the upper end portion thereof, with said conduit means communicating from said control panel to beneath said platform.

8. An operator's station for an electrically powered and controlled vehicle comprising: a platform mounted on said vehicle, a hub fixed to said platform and having a central bore communicating through said platform, an operator's seat, conduit means fixed to said seat and coacting with said hub to allow for 360 degree pivoting movement on the hub about its central axis, said conduit means having a portion extending forwardly and upwardly from the front of said seat, a control panel mounted on said conduit means at the upper end portion thereof, with said conduit means communicating from said control panel to beneath said platform, and operator controlled means for restraining said seat against pivoting movement at any desired seat position.

9. An operator's station for an electrically powered and controlled vehicle comprising: a platform mounted on said vehicle, a hub fixed to said platform and having a central bore communicating through said platform, an operator's seat including a cylindrical frame having a bottom closure, conduit means fixed to said bottom closure and protruding downwardly therefrom and fixed to said cylindrical frame and protruding forwardly and upwardly therefrom, said conduit means and said bottom closure supporting said seat on said hub for pivoting movement about the hub central axis, a control panel mounted on said conduit means at the upper end portion thereof, with said conduit means communicating from said control panel to beneath said platform.

References Cited in the file of this patent

UNITED STATES PATENTS

| 1,988,342 | Slutz | Jan. 15, 1935 |
| 2,092,669 | Greve | Sept. 7, 1937 |
| 2,216,818 | Kuhlman | Oct. 8, 1940 |
| 2,291,626 | Huber | Aug. 4, 1942 |
| 2,298,230 | Radke | Oct. 6, 1942 |
| 2,384,890 | Coldwell | Sept. 18, 1945 |
| 2,669,317 | Celien | Feb. 16, 1954 |
| 2,999,556 | Horne et al. | Sept. 12, 1961 |

FOREIGN PATENTS

| 149,134 | Australia | Nov. 21, 1952 |